(12) United States Patent
Zhang

(10) Patent No.: US 8,068,222 B2
(45) Date of Patent: *Nov. 29, 2011

(54) METHOD AND APPARATUS FOR MICROLENS ARRAY/FIBER OPTIC IMAGING

(75) Inventor: Jingyun Zhang, Upper St. Clair, PA (US)

(73) Assignee: ChemImage Corporation, Pittsburgh, PA (US)

( * ) Notice: Subject to any disclaimer, the term of this patent is extended or adjusted under 35 U.S.C. 154(b) by 1211 days.

This patent is subject to a terminal disclaimer.

(21) Appl. No.: 11/757,146

(22) Filed: Jun. 1, 2007

(65) Prior Publication Data

US 2010/0265498 A1 Oct. 21, 2010

Related U.S. Application Data

(62) Division of application No. 10/962,662, filed on Oct. 13, 2004, now Pat. No. 7,242,468.

(60) Provisional application No. 60/583,840, filed on Jun. 30, 2004.

(51) Int. Cl.
*G01J 3/44* (2006.01)

(52) U.S. Cl. .................... 356/301; 356/445; 356/317

(58) Field of Classification Search .......... 356/317–318, 356/301, 417, 445
See application file for complete search history.

(56) References Cited

U.S. PATENT DOCUMENTS

| 4,601,537 | A | 7/1986 | Saccocio |
| 5,048,959 | A | 9/1991 | Morris et al. |
| 5,194,192 | A | 3/1993 | Seebode |
| 5,210,590 | A | 5/1993 | Landa |
| 5,377,003 | A | 12/1994 | Lewis et al. |
| 5,528,368 | A | 6/1996 | Lewis et al. |
| 6,002,476 | A | 12/1999 | Treado |
| RE36,529 | E | 1/2000 | Lewis et al. |
| 6,069,690 | A | 5/2000 | Xu et al. |
| 6,580,935 | B1 | 6/2003 | Wach |
| 2001/0052979 | A1 | 12/2001 | Treado |
| 2005/0167621 | A1* | 8/2005 | Zeng et al. ............. 250/580 |
| 2007/0063152 | A1* | 3/2007 | Price ..................... 250/458.1 |

OTHER PUBLICATIONS

Treado, P.J. and Nelson, M.P., Raman Imaging in Handbook of Vibrational Spectroscopy, vol. 2: Sampling Techniques, Edited by Chalmers and Griffiths, pp. 1429-1459, John Wiley & Sons, Ltd, 2002.

(Continued)

*Primary Examiner* — Kara E Geisel

(57) ABSTRACT

A novel approach for chemical imaging is disclosed. In one embodiment, the disclosure relates to a system for producing a spatially accurate wavelength-resolved image of a sample from photons scattered from the sample, comprising an optical lens; a first optical fiber bundle of M fibers; a second optical fiber bundle of N fibers; an optical fiber switch; and a charge coupled device, wherein the image comprises plural sub-images, and wherein each sub-image is formed from photons scattered from a predetermined two spatial dimension portion of the sample, and wherein the scattered photons forming each sub-image have a predetermined wavelength different from a predetermined wavelength of scattered photons forming the other sub-images, and wherein the scattered photons for each sub-image are collected substantially simultaneously.

10 Claims, 7 Drawing Sheets

OTHER PUBLICATIONS

Knox, K.T. and Easton, R.L., "Recovery of Lost Writings on Historical Manuscripts with Ultraviolet Illumination," IS&T Reporter, vol. 18, No. 3, Jun. 2003, pp. 1-5.

Exline, D.L., et al., "Forsensic Applications of Chemical Imaging: Latent Fingerprint Detection Using Visible Absorption and Luminescence," Journal of Forensic Science, vol. 48, No. 5, Sep. 2003.

Exline, D.L., et al., "Improved Fingerprint Visualization Using Luminescence and Visible Reflectance Chemical Imaging," Forensic Science Communications, vol. 5, No. 3, Jul. 2003.

Wolfe, et al., "Characteristics of Condom Lubricant Components Using Raman Spectroscopy and Raman Chemical Imaging," Journal of Forensic Science, vol. 48, No. 5, Sep. 2003.

Frew. James, "Difficulties in Dealing with Large Image Cubes," 1960, American Institute of Aeronautics and Astronautics.

Treado, Patrick, "A Miniaturized Raman Fiberscope for Remote Chemical Imaging," Mar. 21, 1997, Proposal to the Ben Franklin Technology Center of Western Pennsylvania.

* cited by examiner

METHOD AND APPARATUS FOR MICROLENS ARRAY/FIBER OPTIC IMAGING

This application claims the filing date benefit of U.S. Provisional Application No. 60/583,840, filed Jun. 30, 2004, the specification of which is incorporated herein in its entirety.

BACKGROUND

Chemical imaging has a powerful capability for material characterization, process monitoring, quality control and disease-state determination. Chemical imaging combines chemical analysis with high-resolution optical imaging including optical spectroscopy, Raman imaging as well as fluorescent and IR techniques.

Raman effect is a phenomenon in which a specimen scatters incident light of a given frequency into a spectrum which has lines caused by interaction of the incident light with the molecules making up the specimen. Different molecular species have different characteristic Raman spectra. Consequently, the Raman effect can be used to analyze the molecular species present in the sample. Raman chemical imaging provides molecular-specific image contrast without the use of strains or dies. Raman image contrast arises from a material's intrinsic vibrational spectroscopic signature which is highly sensitive to the composition and structure of the sample as well as its local environment. As a result, Raman imaging can be performed with little or no sample preparation and is widely applicable for material research, failure analysis, process monitoring and clinical diagnosis.

In early Raman analysis, monochromatic light was used as the excitation source and the scattered light from a sample was passed through a monochromator equipped with diffraction grating in order to select a particular line of the resulting Raman spectrum. U.S. Pat. No. 5,194,192 (incorporated herein in its entirety for background information) discloses a Raman analysis apparatus in which the monochromator with diffraction grating is replaced by an imaging camera with a tunable non-dispersive filter, such as a multi-layer dielectric interference filter. Wavelength tuning offered by the filter is fulfilled by rotating it through various small angles of incidence about an axis perpendicular to the optical axis. Because the wavelength selection is a function of the beam's incident angle, there are at least two inherent disadvantages to using a tunable filter. First, interference filters have a small free spectral range. Second, since the imaging beams emanating from a 2D field of view ("FOV") are not parallel to each other, they do not have the same incident angles and the actual tuned wavelengths at a selected angular position may cover a broad bandpass.

The historical trend in Raman imaging demonstrate that employing means to simultaneously record spatial and Raman spectral information are preferred. As in modern imaging systems, a charge-coupled device ("CCD") is used to record two dimensions of the three-dimensional information inherent in a Raman image data set. Raman imaging systems can be differentiated by the means they employ to collect the third dimension of information. Conventional Raman imaging systems include dispersive monochromator coupled to CCD's that rely on either 2D point scanning or 1D line scanning as described in U.S. Pat. Nos. 5,048,959 and 6,069,690.

Compared to conventional non-imaging systems, a Raman imaging system based on a tunable filter enables visualizing the distribution (morphology and architecture) of chemical species in heterogeneous samples with molecular compositional specificity. Raman images can be collected non-invasively with limited or no sample preparation at high spatial resolution and with high fidelity where the spatial fidelity is limited by the number of pixels of the CCD detector. Most importantly, every image pixel has associated with it a Raman spectrum whose quality is comparable to that obtained with conventional non-imaging spectrometers. Chemical imaging simultaneously provides image information on the size, shape and distribution (the image morphology) of molecular chemical species present with the sample.

In order to acquire 3D data sets in Raman imaging systems, the two dimensions of the image are recorded directly by a CCD camera while the multispectral information is acquired by capturing images at discrete wavelengths selected by the tunable filter. For this purpose, many techniques suitable for tunable filters have been investigated, among which, two types of tunable filters stand out.

The first type, acousto-optic tunable filters ("AOTFs"), is generally described in U.S. Pat. Nos. 5,377,003, 5,528,368 and RE 36,529. An AOTF Raman imaging system can provide high throughput and broad spectral coverage but it has distinct limitations. For example, such filters suffer from broad spectral bandpass which considerably degrades imaging performance from the diffraction-limited conditions. In effect, AOTFs provide spectral resolution that is an order of magnitude worse than that of a typical Raman spectrometer. Spatial resolution is approximately 2.5 times worse for AOTFs than the diffraction limit.

The second type is the liquid crystal tunable filter ("LCTF") which is considered a better alternative to the AOTF. In general, LCTF is an electro-optically controllable spectral bandpass filter which can function from the visible region to the near IR with a continuously tunable wavelength. In an imaging system an LCTF is free of image shift with tuning. A nematic LCTF based on the design of the Lyot birefringent filter has been used in a Raman imaging system, as well as Evans Split-Element type LCTF, as disclosed in U.S. Pat. No. 6,002,476. LTCFs have noticeable drawbacks. For example, LCTFs have a low peak transmittance. In addition, LCTFs are susceptible to thermally-induced drift in their spectral bandpass. In theory, the LCTF is free of optical distortions and spectral leakage; but in reality these defects always exist. Finally, LCTF systems are costly.

SUMMARY OF THE DISCLOSURE

In one embodiment the disclosure relates to a system for producing a spatially accurate wavelength-resolved image of a sample. The system includes a first optical fiber bundle of M fibers; a second optical fiber bundle of N fibers; an optical fiber switch; and a control system to control the charge coupled device and the optical fiber switch.

According to another embodiment, the disclosure relates to a system for producing a spatially accurate wavelength-resolved image of a sample comprising a sample; a photon emission source for illuminating the sample with photons to thereby produce photons scattered by the sample; a first lens for collecting the scattered photons and a second lens for producing imaging photons; a charge coupled device for receiving the imaging photons and producing therefrom a spatially accurate wavelength-resolved image, wherein the system does not include an optical filter.

According to still another embodiment, the disclosure relates to a system for producing a spatially accurate wavelength-resolved image of a sample comprising a sample; a photon emission source; a first collection lens; a second collection lens; a first optical fiber bundle of M fibers; a second optical fiber bundle of N fibers wherein M>N; an optical fiber switch; a charge coupled device; and a control system to control the charge coupled device and the optical fiber switch.

In another embodiment, the disclosure relates to a system for producing a spatially accurate wavelength-resolved image of a sample from photons scattered from the sample, comprising a first collecting lens and a second imaging lens; a first optical fiber bundle of M fibers; a second optical fiber bundle of N fibers; an optical fiber switch; and a charge coupled device, wherein the image comprises plural sub-images, and wherein each sub-image is formed from photons scattered from a predetermined two spatial dimension portion of the sample, and wherein the scattered photons forming each sub-image have a predetermined wavelength different from a predetermined wavelength of scattered photons forming the other sub-images, and wherein the scattered photons for each sub-image are collected substantially simultaneously.

In one embodiment, the disclosure relates to a method for producing a spatially accurate wavelength-resolved image of a sample comprising the steps of providing a sample; illuminating the sample with photons to thereby produce photons scattered by the sample; collecting the scattered photons with an optical device to thereby produce imaging photons; and receiving the imaging photons in a charge coupled device and producing therefrom a spatially accurate wavelength-resolved image.

In another embodiment, the disclosure relates to a method for producing a spatially accurate wavelength-resolved image of a sample comprising the steps of providing a sample; illuminating the sample with photons from a photon emission source; collecting the scattered photons with a first lens and passing the collected photons to a first optical fiber bundle by a second lens; transmitting the collected photons from the first optical fiber bundle to a second optical fiber bundle through an optical fiber switch; and detecting the collected photons with a charge coupled device to thereby produce a spatially accurate wavelength-resolved image of the sample.

In still another embodiment, the disclosure relates to a method for producing a spatially accurate wavelength-resolved image of a sample from photons scattered from the sample, comprising collecting photons scattered from the sample with a first lens, transmitting the collected photons to a first optical bundle by a second lens; transmitting the collected photons to a second optical fiber bundle through an optical fiber switch; and detecting the collected photons with a charge coupled device to thereby produce a spatially accurate wavelength-resolved image of the sample, wherein the image comprises plural sub-images, and wherein each sub-image is formed from photons scattered from a predetermined two spatial dimension portion of the sample, and wherein the scattered photons forming each sub-image have a predetermined wavelength different from a predetermined wavelength of scattered photons forming the other sub-images, and wherein the scattered photons for each sub-image are collected substantially simultaneously.

According to still another embodiment, the disclosure relates to a method for a polarization-independent imaging of a sample comprising processing a plurality of photons scattered by the sample through an objective lens to form a photon beam; processing the photon beam through an imaging lens to form an image on a microlens array positioned at a focal plane of the imaging lens; sampling the image at the microlens array and directing the sampled image to an input optical fiber; transmitting the sampled image to an optical switch module, the switch module receiving M input images points and providing N output sampled image points; processing the N output sampled image points to thereby polarization-independently form an image of the sample at a charge-coupled device.

In still another embodiment, the disclosure relates to a method for forming a Raman image from a sample, the method comprising the steps of collecting a plurality of photons scattered by the sample; processing the plurality of the photons through an optical arrangement to form a first image on a focal plane; communicating the first image through an input optical fiber, the input optical fiber having M optical fiber channels forming M output signals; sampling the M input signals at a first rate and producing N output signals; processing the N output signals through a spectrometer to form the Raman images of the sample.

BRIEF DESCRIPTION OF THE DRAWINGS

The exemplary embodiments are presented herein with reference to the following figures in which similar components are numbered similarly, and where.

DETAILED DESCRIPTION OF THE DISCLOSURE

Figure 1:
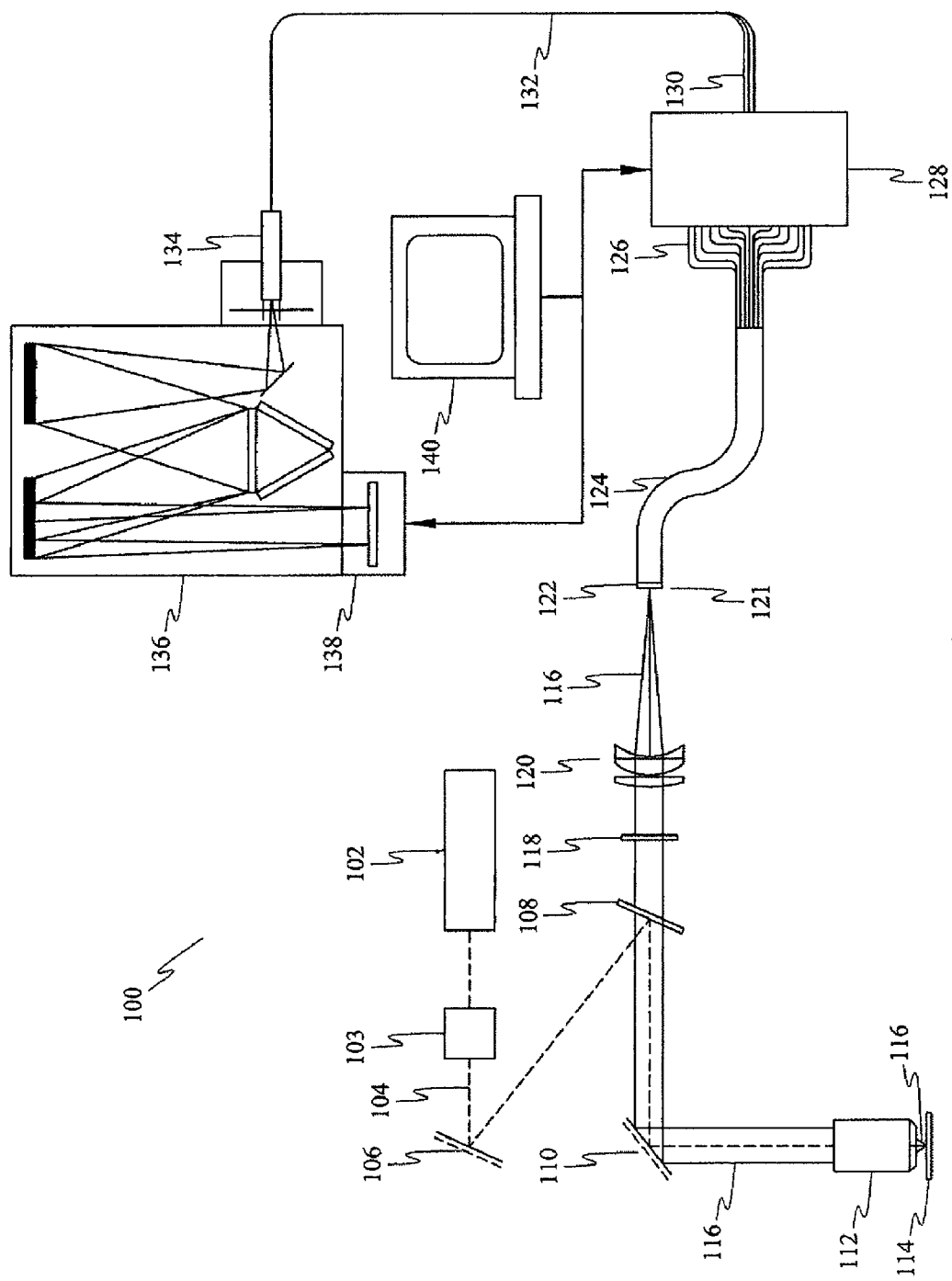
FIG. 1 is a schematic diagram representing an apparatus according to one embodiment of the disclosure.

As stated, in Raman spectroscopy, laser light induces a scattering effect on the sample. Chemical composition and structure are determined by the light emitted from the sample. Typical data output includes intensity values at wavelengths in a predefined range. In Raman chemical imaging, Raman spectroscopy is combined with imaging processes. Light intensity is recorded as a function of both wavelength and location. The image domain contains the full image at each individual wavelength. The spectroscopy domain contains the fully resolved spectrum at each individual pixel. As a result of Raman chemical imaging, both structural and compositional information can be determined consistently.

The embodiments disclosed herein provide novel method and apparatus particularly suitable for analytical chemistry, biotechnology, material science, medical science and pharmaceuticals. The embodiments disclosed herein retain the advantageous features of both non-imaging Raman spectroscopy and wide-field Raman imaging systems including a large FOV of the sample, high spatial resolution imaging and high spectral resolution in 3D data sets. The principles disclosed herein overcome drawbacks and limits of the conventional techniques.

A novel chemical imaging disclosed herein is capable of generating 3D data sets by collecting radiations from a sample which reflects or scatters the incident illumination light or emits radiations at wavelengths longer than that of the excitation source. The output of the chemical imaging system can be a complete set of sample spectra of every point within FOV or a set of sample 2D images created at discrete but adjacent wavelengths. These forms can be mutually transformed by a control software.

The chemical imaging system according to one embodiment of the disclosure may include an illumination sources and associated optics (or optical lenses), collecting optics, imaging optics, an image sampling microlens array, an input fiber bundle, an optical fiber switch matrix, an output fiber bundle, a monochromator equipped with gratings, a CCD and a system control computer.

The illumination source may include a monochromatic laser, an ultra-violet ("UV") lamp, or a tungsten halogen lamp depending on whether the system is used for Raman imaging, fluorescent imaging or near IR imaging. The collecting optics may be a microscope objective or, optionally, an infinity-corrected objective. The imaging optics may be a microscope tube lens or a lens assembly composed of the tube lens and video adaptor lenses.

A sampling microlens array may optionally be used to maximize the coupling efficiency. With a proper configuration, the coupling efficiency can be as high as 100%. The microlens array can be positioned within the same focal plane of the imaging lens and coincidentally interface the input fiber bundle. The microlens array may have a number of microlenses to match the number of optical fibers in the fiber bundle. Thus, if M optical fibers are provided in the input fiber bundle, a microlens array having greater or equal to M microlenses can be used. The aperture for each microlens in the array may be either square or hexagonal or any other shape that matches the input fiber bundle format. The aperture size of the microlens array and that of the input and output fibers may be selected to be uniform. The microlens array can manipulate the input image in three aspects: (1) it spatially divides the input image into discrete sampled pixels with sampling size equal to microlens aperture; (2) every microlens in the array focus the sampled imaging beams, converting their lower N/A into higher N/A, but compatible to that of fibers; (3) through step (2), the focused beams are coupled into corresponding fibers in the input fiber bundle.

The input fiber bundle may include M multimode fibers working over a spectral range from visible to near IR. The input fibers direct their input to the M input channels of the optical fiber switch matrix. The connection can be made through standard fiber connectors. The output fiber bundle of optical fiber switch matrix may contain N multimode fibers working over the same spectral range. The fiber spatial positions at output end may be arranged in a linear format. In one embodiment of the disclosure, the relation between M and N may be characterized as $M \gg N$.

A microprocessor programmed by a software can be used to synchronize the system operation. For example, the optical fiber switch can be controlled to function as N individual [n×1] switch sub-arrays, where n=M/N. The operation for imaging a sample can be carried out through n exposure-periods, where each exposure-period may last from a fraction of second to tens of seconds, depending on the nature of the specimen. Switching between adjacent exposure-period may take about 10 to 100 milliseconds.

In one embodiment of the disclosure, the optical fiber switch matrix is made of the same type of optical fiber as the input and output fiber bundles and includes M input channels and N output channels for functioning as N [n×1] switch arrays, where n=M/N. The monochromator can have a 1:1 optics between its input slit and output CCD. The slit's width may be variable. The height of the slit may be selected to be the same as the height of CCD to accommodate N output fibers in a linear format. The height of CCD limits the maximum value of N. The software can also be used to synchronize the fiber switch matrix and the CCD for spectra/image acquisition.

According to one embodiment of the disclosure, during the $1^{st}$ exposure-period, all the $1^{st}$ channels in N [n×1] switch sub-arrays can be switched to their output channels. The N output channels are arranged in a linear format and fed into the monochromator at its entrance slit position; inside the monochromator, N spectra are generated and acquired by the CCD. During the $2^{nd}$ exposure-period, all the $2^{nd}$ channels in N [n×1] switch sub-arrays are switched to their output channels and the same imaging process for spectra acquisition is carried out. The entire operation may be complete when all the $n^{th}$ channels in N [n×1] switch sub-arrays are switched to output channels and the last group of N spectra is obtained. The control of switching and data acquisitioning between switch matrix and the CCD can be synchronized by a controller (e.g., a microprocessor programmed with a software.) As a result, a 3D data set of Raman spectra of the specimen can be produced. The resulting Raman spectra contains as much information as that obtained by both Raman spectroscopy and Raman chemical imaging according to the conventional techniques.

FIG. 1 is a schematic diagram representing an apparatus according to one embodiment of the disclosure. Referring to FIG. 1, a Raman apparatus 100 is shown to include excitation source 102. Excitation source may be a laser (Nd:YVO$_4$) operating at about 532 nm. The output of excitation source 102 is directed to laser delivery optics 103. Laser optics 103 may be (1) a beam-expanding optics, or (2) coupling optics plus laser delivery fiber for delivering the Raman excitation laser with the desired beam quality and profile at the expected spatial position. For the latter case, a dielectric bandpass filter for efficiently removing SiO$_2$ Raman bands that arise from the laser delivery fiber can be incorporated in laser optics 103.

The laser light represented by dashed line 104 is directed to a reflecting mirror 106 and then to a longpass optical filter 108. Optionally, longpass filter 108 is optimized for oblique illumination at some angle relative to normal incidence. From optical filter 108, laser light 104 can be introduced into the Raman chemical imaging system by reflection. For this purpose, the reflected laser light 104 propagates to folding mirror 110 and through objective lens 112 and illuminates sample 114. Objective lens 112 may include conventional objective lenses as used, for example, in a microscope.

From sample 114, Raman emission 116 at wavelengths longer than 532 nm is collected by the same objective 112, which collimates Raman emission 116. In the embodiment of FIG. 1, Raman beam 116 is reflected by folding mirror 110 and propagates through filter 108 and laser line rejecting filter 118. Filter 118 may be optionally selected to be a Notch filter. After propagating through filter 118, Raman beam 116 enters imaging lens 120. Imaging lens 120 can focus Raman beam 116 into a magnified image at focal plane 121. Microlens array 122 is shown to reside within focal plane 121.

Figure 2:
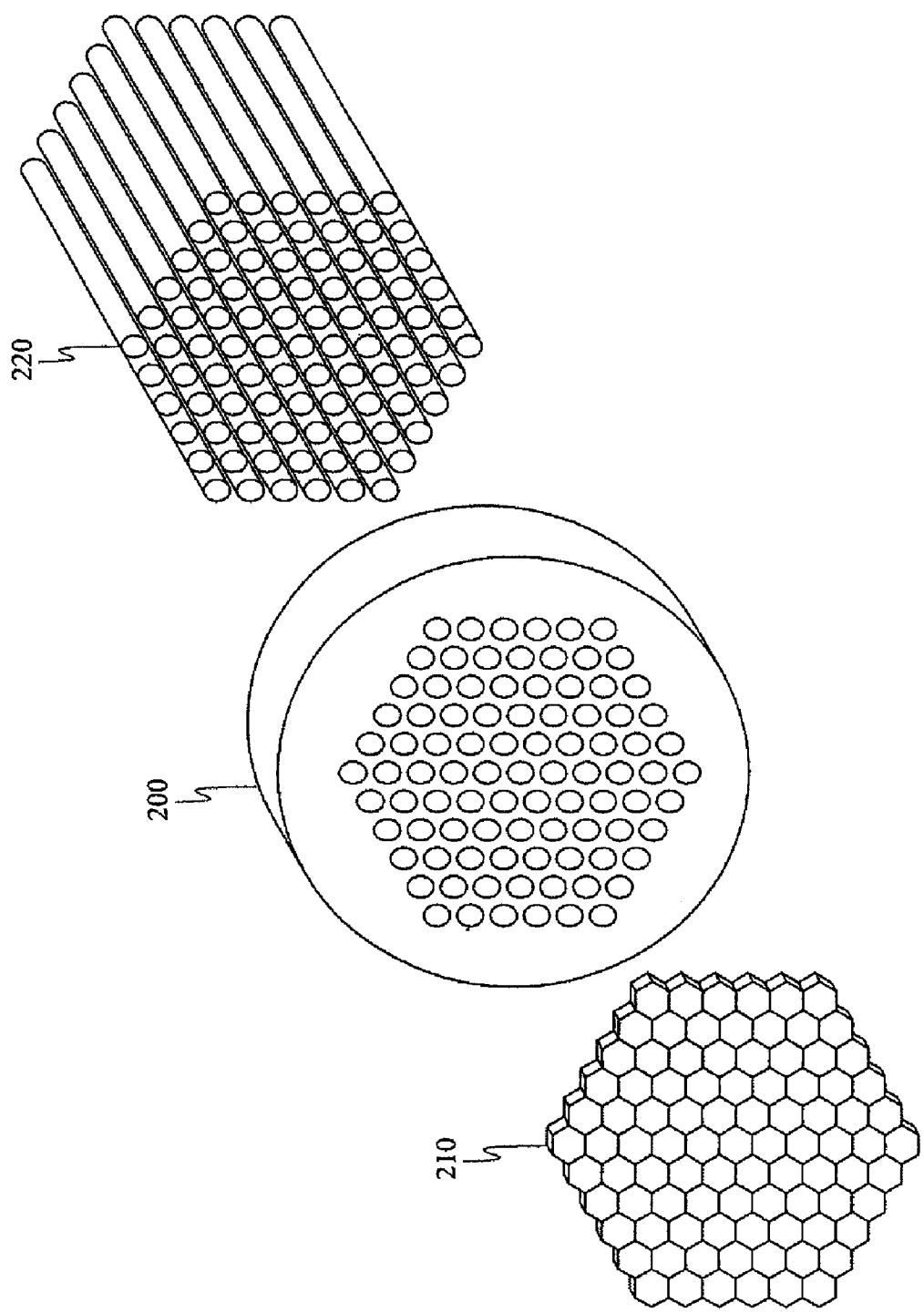
FIG. 2 shows a microlens array according to an embodiment of the disclosure.

FIG. 2 shows an enlarged microlens array and fiber bundle, according to an embodiment of the disclosure. Referring to FIG. 2, microlens array 200 is shown to have a hexagonal format. The fiber holder 210 is shown as an optional part with the same hexagonal structure. Fiber bundle is represented by 220. In practice, 200, 210 and 220 can be formed together.

Other structural configurations can be used without departing from the principles of the disclosure.

Referring to FIG. 1, microlens array 122 divides the input Raman image by, for example, sampling the image via a microlens aperture (not shown). Each element of microlens 122 focuses the sampled portion of Raman signal into its corresponding fiber (see fibers 220, FIG. 2) within the input fiber bundle 124. Using microlens array can bring coupling efficiency to as high as 100%.

Figure 3C:
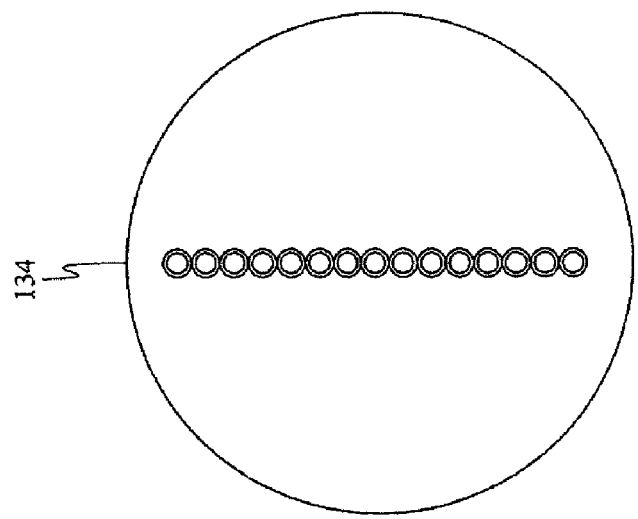
FIG. 3C shows an exemplary configuration for the output fiber bundle.
Figure 3B:
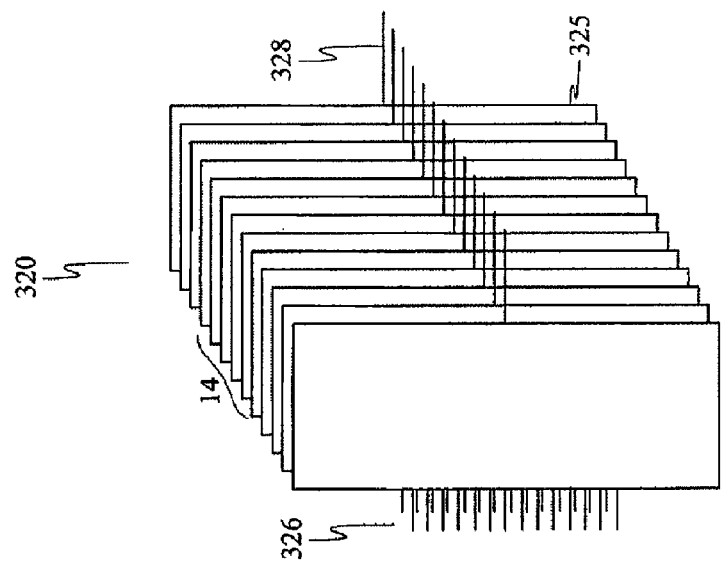
FIG. 3B schematically illustrates an optical switch module.
Figure 3A:
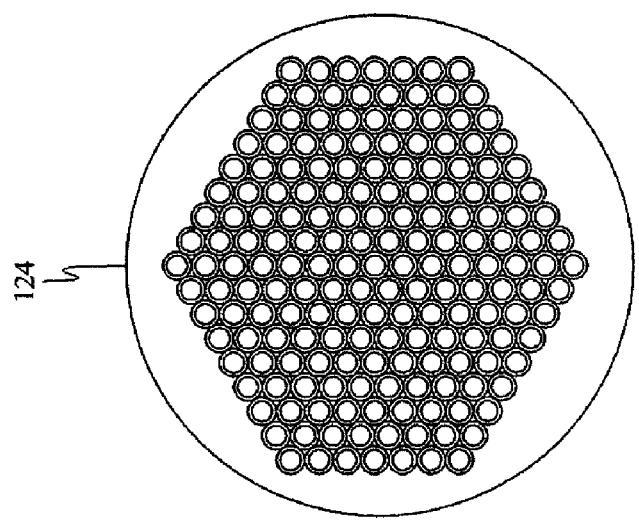
FIG. 3A schematically shows a multimode fiber bundle.

For the non-exclusive embodiment of FIG. 3, input fiber bundle 124 (as also shown in FIGS. 2 and 3A) have 169 multimode fibers with core/cladding equal to 110/140 µm covering an effective FOV of Ø2.1 mm on the image plane 121. The output fibers of 124 are connected to the input channels 126 of an optical fiber switch module 128. The switch module may have up to 180 input channels and handle 169 inputs and 14 outputs. In one embodiment, switch module 128 may be reconfigured as 14 switch sub-modules of 12×1 format (see FIG. 3B). One exemplary switch module is the SC switch module manufactured by JDS Uniphase.

FIG. 3B schematically illustrates an optical switch module. In FIG. 3B, switch module 320 is shown as having 14 sub-modules. Each sub-module 325 includes a 12-pin input 326 and a 1-pin output 328 to provide a 12×1 switching format.

Referring again to FIG. 1, the output of switch module 128 is represented as fiber bundle 130 which is coupled to output fiber bundle 132. FIG. 3C shows an exemplary configuration for output fiber bundle 134. Referring to FIG. 3C and FIG. 1 output fiber bundle 134 is shown to have a linear arrangement for communicating the signal received from switch module 128 to monochromator 136 by aligning the linear fiber format with the input slit direction of monochromator 136. The output from monochromator 136 is directed to CCD 138 as a Raman spectra.

Consistent with the exemplary embodiment of FIG. 1, for a given sample 12 frames of multi-spectra have to be generated in time sequence to produce a complete 3D data set. The control of switch module 128 and data acquisition by CCD 138 are synchronized by system computer 140.

Figure 4A:
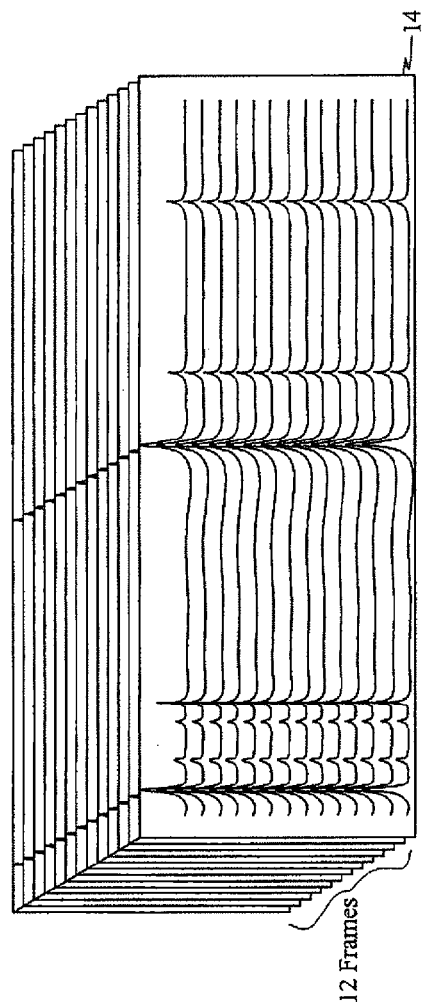
FIGS. 4A and 4B illustrate two forms of the output data presented in 3D and obtained in accordance with one embodiment of the disclosure.
Figure 4B:
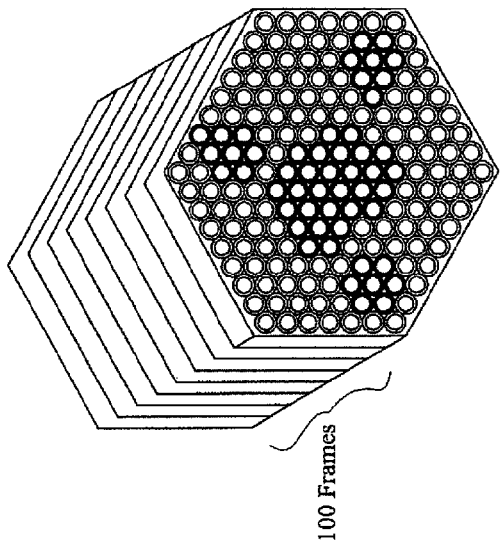

FIGS. 4A and 4B illustrate two forms of the output data presented in 3D and obtained in accordance with an embodiment of the disclosure. Specifically, FIG. 4A shows the original data which comprise of 12 frames of spectra, each of which contains 14 individual spectra, providing a total of 168 spectra representing 168 points on image plane 121. For the data set shown in FIG. 4A horizontal coordinate represents wavelength (λ), rows within each frame correspond to different spectra from different points and the third direction represents different frames. If a column of this data set is selected (i.e., a particular wavelength is selected) then 14 points from 14 spectra within one data frame are chosen and all 12 frames will give 168 image values for 168 points. Furthermore, if all of the 168 points are spatially re-arranged by software back to the arrangement generated by sampling at image plane 121, then a 2D image can be recovered. Such a conversion on the whole data set as shown in FIG. 4A can give another 3D dataset as shown in FIG. 4B representing hundreds of 2D images of the sample at hundreds of wavelengths.

The spatial resolution of the 2D images shown in FIG. 4B is governed by the fiber diameter in fiber bundle 124 and the total magnification offered by objective 112 and imaging optics 120 of FIG. 1. For the exemplary embodiment of FIG. 1, when magnification is 100×, the image resolution is 1.4 µm. When the magnification is 400×, the image resolution is 0.35 µm, which is about equal to that determined by diffraction limit at visible band by an objective with high N.A.

Figure 5B:
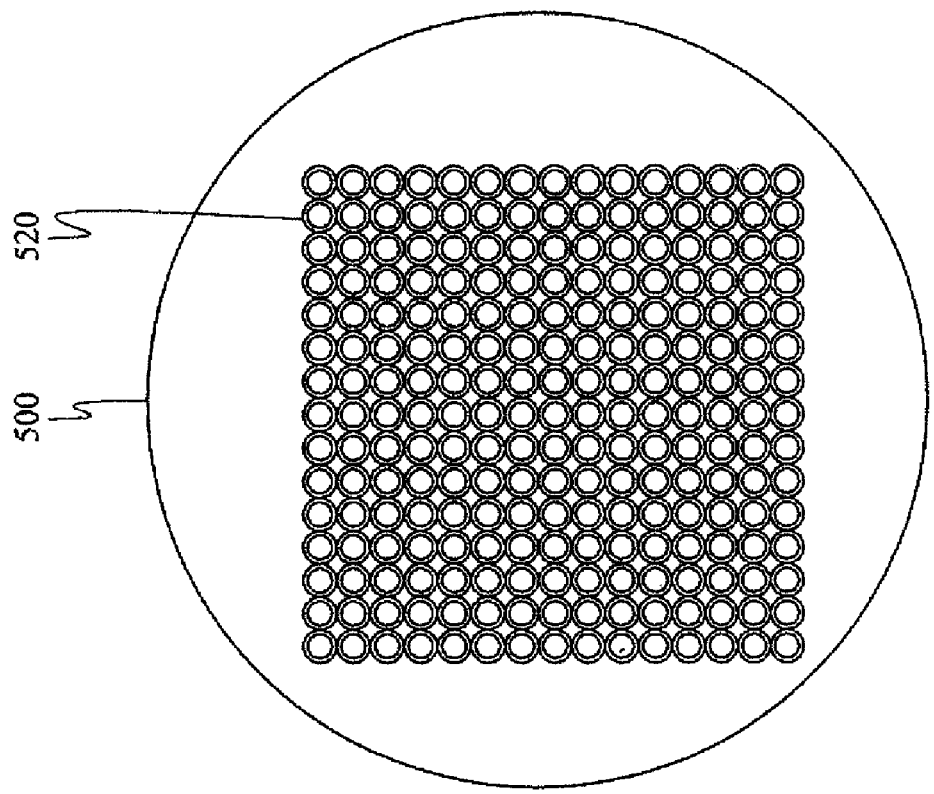
FIGS. 5A and 5B show alternative arrangements for microlens array and input fiber bundles.
Figure 5A:
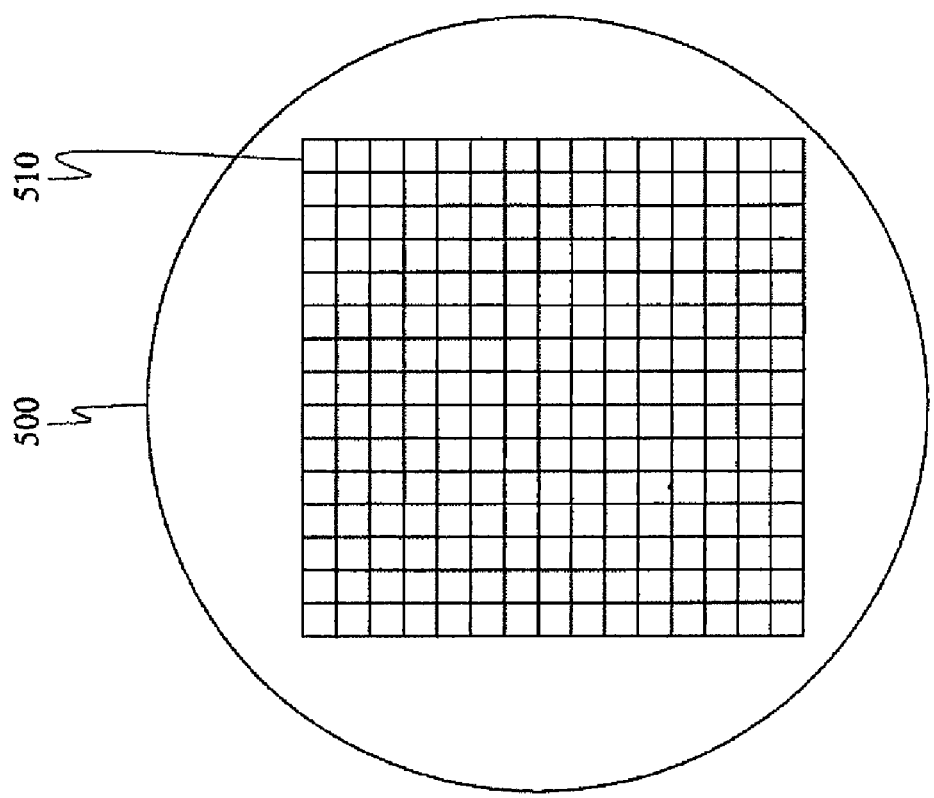

FIGS. 5A and 5B show an alternative arrangements for the microlens array and the input fiber bundle according to another embodiment of the disclosure. Referring to FIG. 5A, the microlens elements 510 in the array have a square aperture which is composed of 13 rows and 13 columns, resulting in 169 input channels. Individual apertures 'm' can be measured as 0.14×0.14 mm² leading to a FOV average of 1.82×1.82 mm², or 2.57 mm in diameter, both in image plane 121. The replacement of the microlens array and the input fiber bundle into the embodiment of FIG. 1 requires no change to the existing hardware and renders the Raman channel imaging system fully functional.

Figure 6:
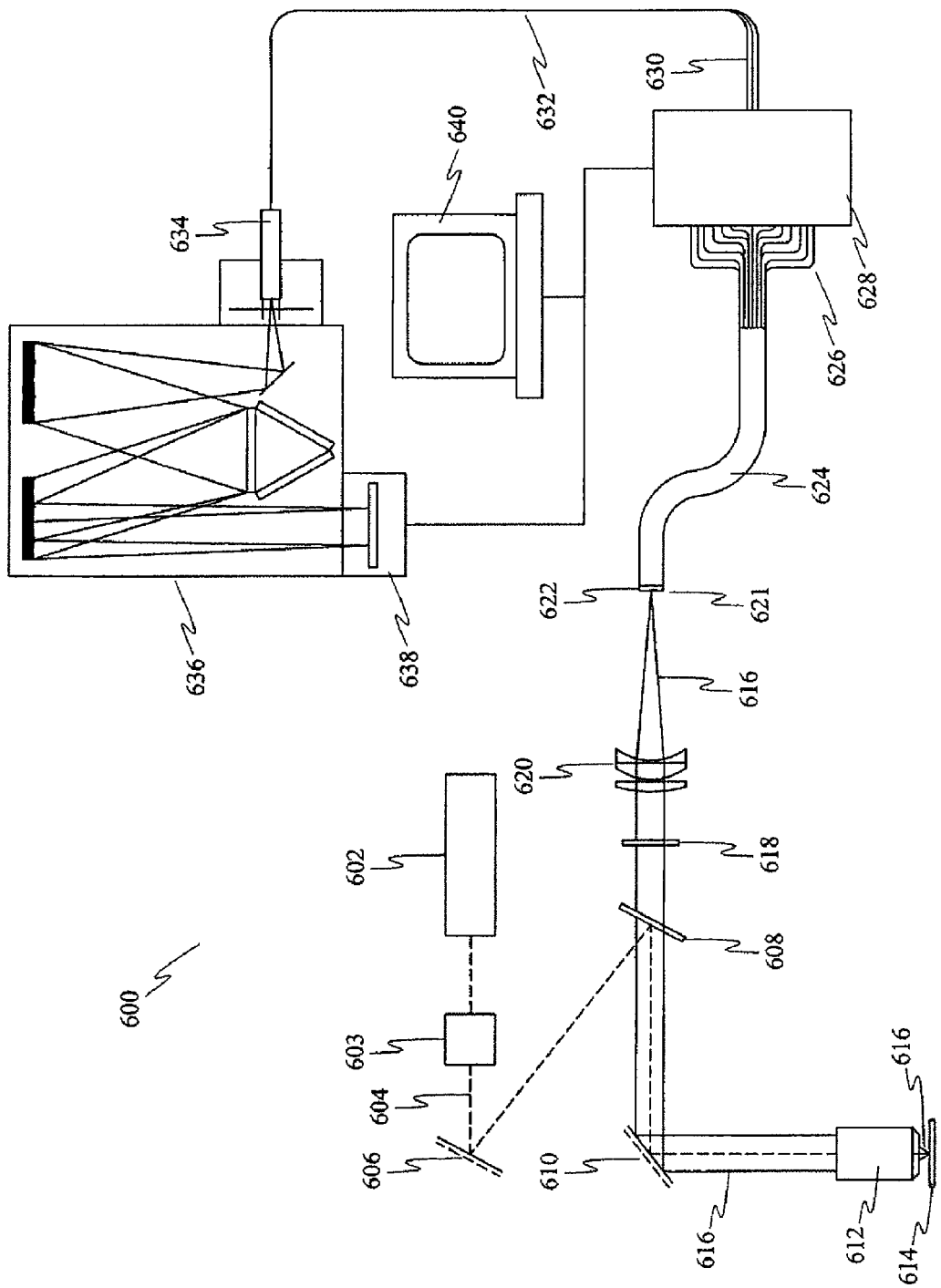
FIG. 6 is a schematic diagram representing an apparatus using a fluorescent excitation source according to one embodiment of the disclosure.

FIG. 6 is a schematic diagram representing an apparatus according to another embodiment of the disclosure. Referring to FIG. 6, apparatus 600 generally includes similar components to that shown in relation in FIG. 1. However, excitation illumination source is now replaced by a fluorescent illumination source 602. Fluorescent source 602 can be either a suitable type of laser or UV lamp for fluorescent excitation. Illumination optic 603 is positioned between excitation source 602 and deflection device 606 in order to deliver the fluorescent excitation light with the desired beam quality and profile at the expected spatial position. Since the fluorescent radiation excited on the sample surface are at wavelengths longer than that of the excitation source, longpass filter 608 will reflect the excitation light toward the sample and allow the excited fluorescent radiation to propagate through it entering the rear imaging system. As a result, 3D data set of fluorescent imaging from the sample can be obtained.

Figure 7:
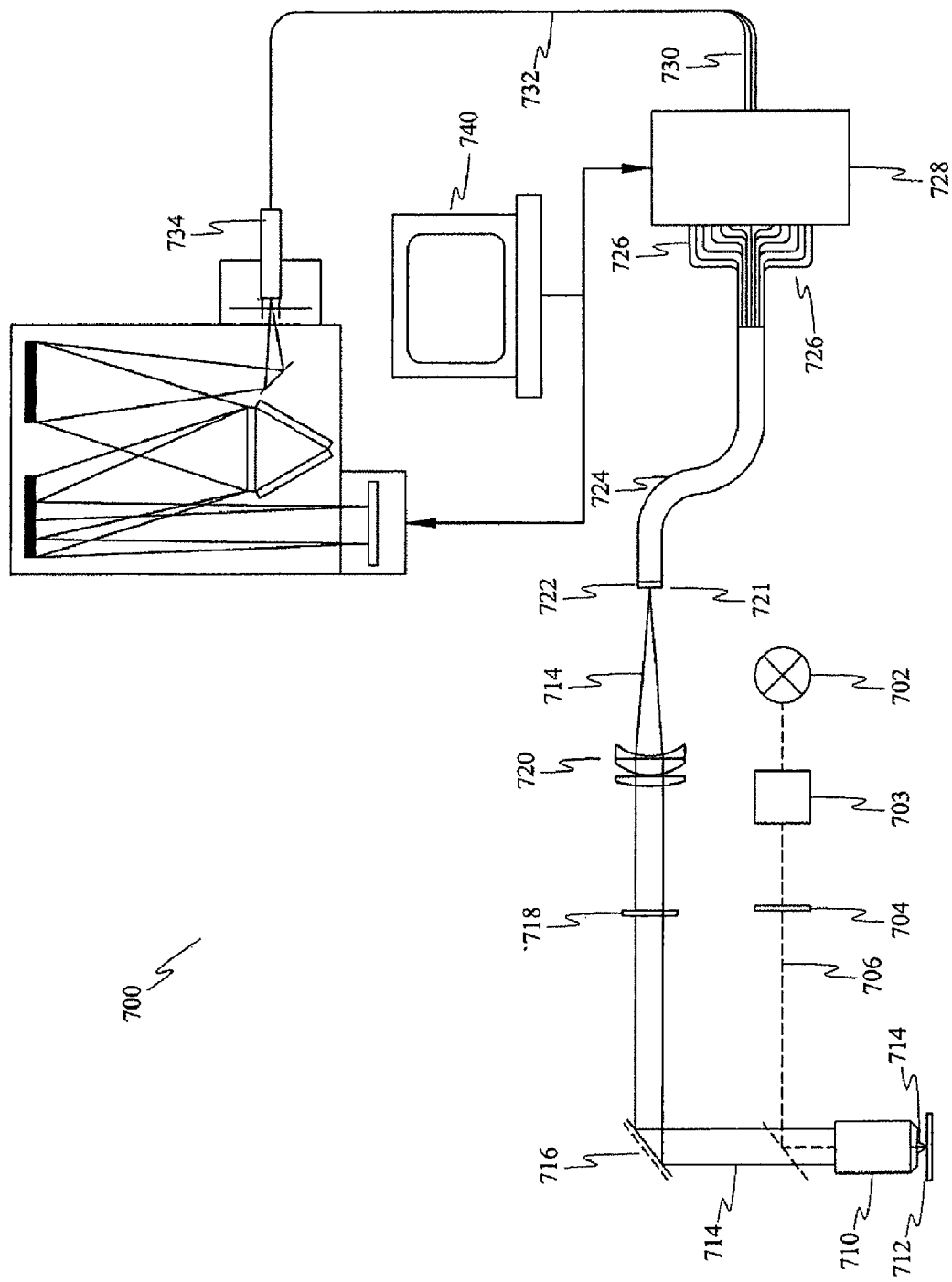
FIG. 7 is a schematic diagram representing an apparatus using a near IR excitation source according to one embodiment of the disclosure.

FIG. 7 is a schematic diagram representing an apparatus according to another embodiment of the disclosure using a near IR excitation source. In apparatus 700 in FIG. 7, near IR illumination introduced in epi-illumination is provide by source 702 (e.g., tungsten halogen lamp operating from visible to near IR spectral region) whose output in free space is collected by optical device 703. Optical device 703 serves as a delivery optics to ensure delivery of the near IR illumination light with the desired beam quality and profile at the expected spatial position. Since it works together with objective lens 710, the desired near IR illumination on the sample 712 can be generated. After passing through a near IR filter 704, the IR light represented by dashed line 706 is directed to a near IR 50/50 beamsplitter 708. From 708, about 50% of the IR light 706 is introduced into the near IR chemical imaging system via reflection. The reflected IR light propagates through the objective 710, which works over near IR band and can illuminate sample 712.

Once illuminated, the near IR reflection 714 is collected by the same objective 710 which also collimates the transmitted beam. The collimated beam 714 propagates through beamsplitter 708 again by losing about 50% of IR imaging energy. Thereafter, it propagates to a folding mirror 716 and through a filter 718 which rejects the visible light portion of the beam.

After propagating through filter 718, IR beam 714 enters an IR imaging lens 720 which focuses the beam into a magnified image at the focal plane 721. In one embodiment of the disclosure, microlens array 722 is placed within focal plane 721. The microlens array 722 may have a hexagonal aperture structure as shown in FIG. 2. Microlens array 722 divides the input Raman image by sampling it via microlens apertures. Each element of Microlens array 722 can focus the sampled portion of IR signal into its corresponding fiber within the input fiber bundle 724. Input fiber bundle 724 may be made from near IR fibers to interface with microlens array 722. In both theory and practice, the usage of microlens array 722 may bring the coupling efficiency to as high as 100%. For the exemplary embodiment of FIG. 7, input fiber bundle 724 may have a configuration as shown in FIGS. 2 and 3A (i.e., consisting of 169 multimode fibers each core/cladding waual to 110-140 μm) to cover an effective FOV of Ø2.1 mm on the image plane 721. Output fibers 732 are coupled to input channels 726 of an optical fiber switch module 728. A JDS Uniphase SC switch module as discussed above may be used, which may have up to 180 input channels for receiving 169 inputs and 14 outputs. (See FIG. 3B.)

The approach disclosed herein is independent from polarization of the photons, leading to a maximized signal throughput for imaging. Thus, the time needed for chemical imaging at low excited Raman radiation level is significantly reduced and measurement efficiency is improved. The embodiments disclosure herein provide the following additional advantages: (1) large FOV of the specimen; (2) high spatial resolution (approaching to diffraction limited) for 2D Raman or chemical images; (3) spectral bandpass can be as narrow as 3.3 cm$^{-1}$ or limited to that offered by gratings in the monochromator; (4) imaging is polarization independent; (5) signal throughput for imaging is maximized; (6) time needed for chemical imaging at low excited radiation levels becomes shorter; (7) flexibility of imaging only over area of interest on the sample; (8) no moving parts involved (e.g., electro-mechanical moving parts such as scanners); and (9) composition/structure of chemical imaging system can be simplified thereby reducing cost.

It is noted that although the disclosure has been described in relation to certain exemplary embodiments presented herein, the principles of the disclosure are not limited thereto and include any modification and permutation to the embodiments presented herein. Further, the inventive embodiments disclosed herein are not exclusive to Raman imaging applications and may be used successfully with, among others, fluorescent and near IR chemical imaging systems.

What is claimed is:

1. A system for producing a spatially accurate wavelength-resolved image of a sample from photons
   either emitted or reflected from the sample, comprising:
   an optical lens collecting the either emitted or reflected photons and delivering imaging photons;
   a first optical fiber bundle of M fibers receiving the imaging photons via the optical lens;
   a second optical fiber bundle of N fibers receiving the imaging photons via the first optical fiber bundle and transmitting the imaging photons to a charge coupled device;
   an optical fiber switch coupling the first optical fiber bundle and the second optical fiber bundle;
   wherein the image comprises plural sub-images, and
   wherein each sub-image is formed from photons either emitted or reflected from a predetermined two spatial dimension portion of the sample, and
   wherein the either emitted or reflected photons forming each sub-image have a predetermined wavelength different from a predetermined wavelength of either emitted or reflected photons forming the other sub-images, and
   wherein the either emitted or reflected photons for each sub-image are collected substantially simultaneously.

2. The system of claim 1 wherein M>N.

3. The system of claim 1 wherein the optical lens provides magnification.

4. The system of claim 1 wherein the spatially accurate wavelength-resolved image is produced without moving the sample.

5. The system of claim 1 wherein the system is polarization-independent.

6. The system of claim 1 wherein the spatially accurate wavelength-resolved image is a Raman image of the sample.

7. The system of claim 1 wherein the optical fiber switch is an electro-optical switch.

8. The system of claim 7 further comprising a controller for controlling the optical fiber switch and the charge coupled device.

9. A method for producing a spatially accurate wavelength-resolved image of a sample from photons either emitted or reflected from the sample, comprising:
   collecting photons either emitted or reflected from the sample with an optical lens;
   transmitting the collected photons to a first optical fiber bundle;
   transmitting the collected photons to a second optical fiber bundle through an optical fiber switch; and
   detecting the collected photons with a charge coupled device to thereby produce a spatially accurate wavelength-resolved image of the sample,
   wherein the image comprises plural sub-images, and
   wherein each sub-image is formed from photons either emitted or reflected from a predetermined two spatial dimension portion of the sample, and
   wherein the either emitted or reflected photons forming each sub-image have a predetermined wavelength different from a predetermined wavelength of either emitted or reflected photons forming the other sub-images, and
   wherein the either emitted or reflected photons for each sub-image are collected substantially simultaneously.

10. The system of claim 9 wherein the spatially accurate wavelength-resolved image is a Raman image of the sample.

* * * * *